United States Patent

[11] 3,634,663

| [72] | Inventors | Wallace L. Williams<br>Raleigh, N.C.;<br>David F. Wright, Bolton, Mass. |
|---|---|---|
| [21] | Appl. No. | 801,949 |
| [22] | Filed | Feb. 25, 1969 |
| [45] | Patented | Jan. 11, 1972 |
| [73] | Assignee | Westinghouse Electric Corporation<br>Pittsburgh, Pa. |

[54] REMOTE READING MEASURING SYSTEM
10 Claims, 3 Drawing Figs.

[52] U.S. Cl. .................................................235/151.31,
324/103, 340/183, 235/151.21
[51] Int. Cl. .......................................................G08c19/00,
G06f 15/20, G01r 19/16
[50] Field of Search............................................235/151.31,
151.21; 324/103, 142; 307/88, 57; 179/2;
340/150, 177, 203, 183, 184

[56] References Cited
UNITED STATES PATENTS

| 3,082,330 | 3/1963 | Ward | 340/183 X |
|---|---|---|---|
| 3,266,018 | 8/1966 | Higgins | 340/183 X |
| 3,478,342 | 11/1969 | Alldritt et al. | 340/183 X |
| 3,500,024 | 3/1970 | Stacy et al. | 340/183 X |
| 3,187,337 | 6/1965 | Otterlei | 340/177 |
| 3,231,670 | 1/1966 | Lane et al. | 179/2 |
| 3,266,018 | 8/1966 | Higgins | 179/2 X |
| 3,343,084 | 9/1967 | Gambale et al. | 324/103 |
| 3,352,971 | 11/1967 | Nilsson et al. | 179/2 |

*Primary Examiner*—Malcolm A. Morrison
*Assistant Examiner*—Edward J. Wise
*Attorneys*—A. T. Stratton and C. L. Freedman ABSTRACT: From each of a large number of remote stations an alternating current having a frequency dependent on a quantity to be measured is generated for the purpose of being transmitted to a central station at which measurements are to be computed or recorded. Each quantity is sampled at intervals. At the central station the samples are computed to determine the desired quantities and suitable records are prepared.

PATENTED JAN 11 1972
3,634,663
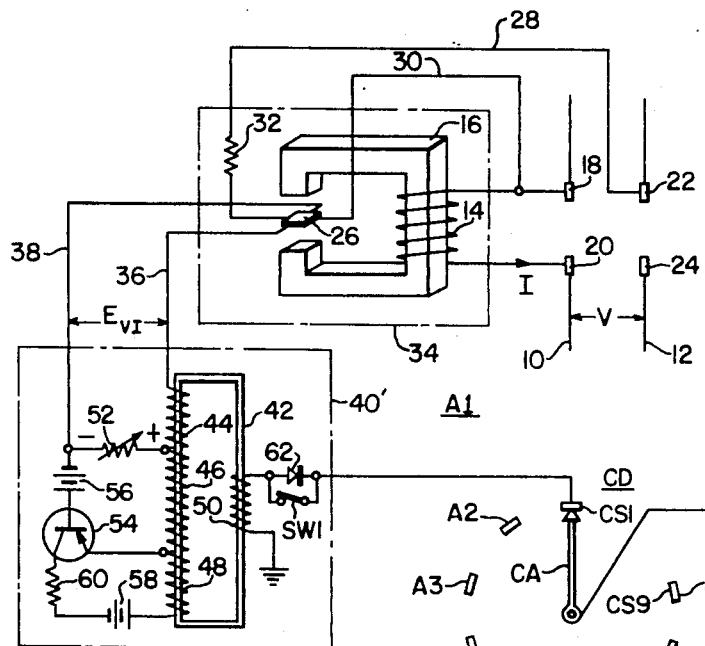
FIG. 1.
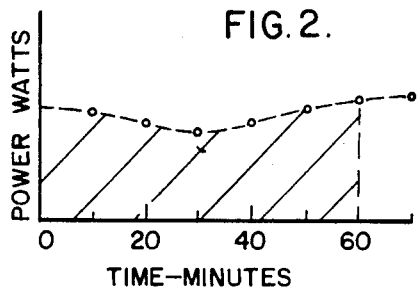
FIG. 2.
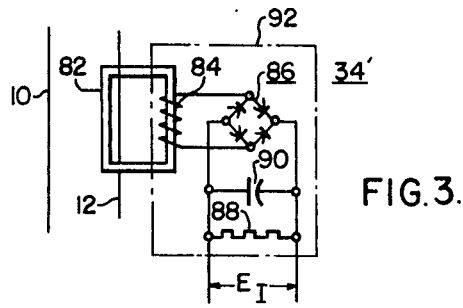
FIG. 3.
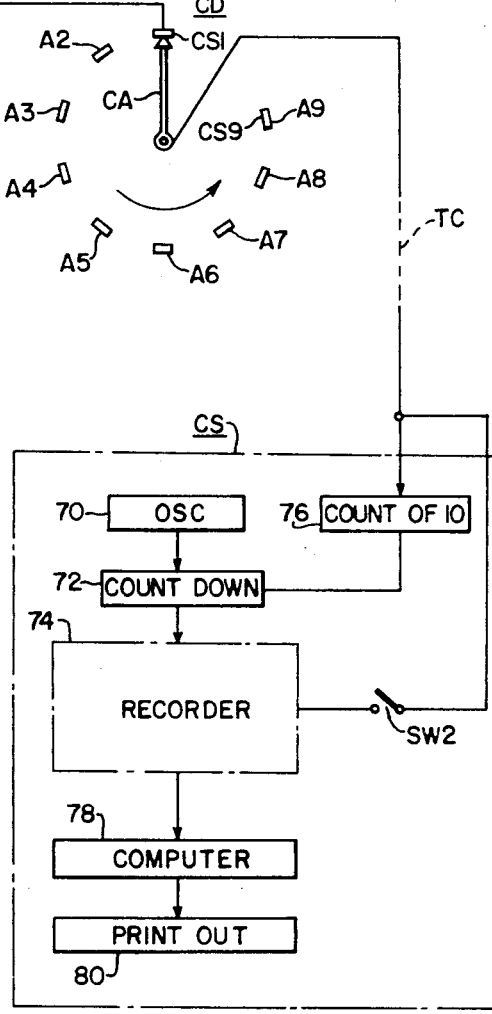
WITNESSES
Theodore F. Wrobel
James T. Young
INVENTORS
David F. Wright and
Wallace L. Williams
BY C. L. Freedman
ATTORNEY

REMOTE READING MEASURING SYSTEM

BACKGROUND OF THE INVENTION

1. Field of the Invention

This invention relates to the remote reading of variable quantities and it has particular relation to the transmission of readings from integrating meters located at remote stations to a central station and to the interpretation of such readings.

Although the invention is applicable to measurements of fluids such as gas and water it is particularly suitable for the measurement of electrical quantities and will be described as applied to the measurement of such electrical quantities.

2. Description of the Prior Art

In order to measure the consumption of electric energy it has been the practice to provide at each consumer location a watt-hour meter. Each of the watt-hour meters has been read at intervals by a person who manually notes the reading thereof.

With the objective of reducing the cost of reading the numerous watt-hour meters many proposals have been made for automatically transmitting the readings from the remote stations at which the watt-hour meters were located to a central station at which the readings could be recorded and computations made for the purpose of submitting bills to the consumers. These proposals provide for the transmission of information between remote stations and the central stations over channels such as telephone lines, pilot wires, or powerline carrier. One of the major deterrents to the adoption of these proposals has been the cost of the transmitter required for each of the numerous remote stations.

SUMMARY OF THE INVENTION

In accordance with the invention the watt-hour meter conventionally provided for each consumer of electric energy is replaced by a device capable of delivering a voltage proportional to the electric quantity being delivered to the consumer. Thus a Hall generator may be employed for the purpose of providing a voltage output proportional to electric power. As another example a current transformer may be employed for the purpose of delivering a voltage proportional to the electric current supplied to the consumer.

A generator is associated with the device for the purpose of delivering current pulses or alternating current having a frequency dependent on the voltage output of the device for transmission over a suitable channel to a central station where the transmitted quantity may be recorded or utilized as desired. In a preferred embodiment of the invention an ancillary source provides pulses or alternating current having a frequency which is large relative to that of the transmitted information. The output pulses or cycles of the ancillary source are counted for intervals dependent on the frequency of the information transmitted over the channel.

The devices of the consumers are sequentially interrogated or scanned at regular intervals. This provides samples for each consumer at the central station which may be combined on a statistical basis by a computer to form a basis for billing each consumer.

The devices of the consumers may be of an analog type and the analog output then may be converted into a digital signal for transmission to the central station. The scanning could be done before the process of converting the analog to a digital signal.

It is therefore an object of the invention to provide a system for sampling variable quantities at the location of each of a plurality of consumers and transmitting the sampling to a central station.

It is also an object of the invention to provide a system as set forth in the preceding paragraph wherein means are provided for transmitting information from the consumer locations to the central station by means of alternating currents having frequencies which vary in accordance with the information to be transmitted.

It is another object of the invention to provide a method for sampling quantities supplied to numerous consumers and for transmitting information concerning such sampling to a central station.

BRIEF DESCRIPTION OF THE DRAWING

Other objects of the invention will be apparent from the following description taken in conjunction with the accompanying drawing in which:

FIG. 1 is a view partly diagrammatic and partly schematic of an electric system employing power-to-voltage conversion devices for transmitting information from numerous consumers to a central station;

FIG. 2 is a graphical representation showing power as ordinates plotted against time as abscissas; and FIG. 3 is a view partly diagrammatic and partly schematic showing a current-to-voltage conversion device which may be employed in place of the power-to-voltage conversion device of FIG. 1.

DESCRIPTION OF THE PREFERRED EMBODIMENT

Referring to the drawing FIG. 1 shows a plurality of remote stations A1 to A9 from which information is to be transmitted to a central station CS. Although a much larger number of remote stations may be involved the invention may be described with reference to nine remote stations as shown in FIG. 1.

Information may be transmitted between the remote stations and the central station over any conventional transmitting channel TC. Thus the channel TC may represent telephone lines, pilot wires, radio communication or carrier communication over powerlines.

The transmitting channel TC may be coupled successively and repetitively to the remote stations in any conventional manner. For present purposes it will be assumed that a commutating device CD is employed having a separate contact segment CS1 to CS9 for the remote stations A1 to A9 respectively, the contact segments being arranged in a circle wherein the contact segments are equally spaced from each other except for the contact segments CS1 and CS9 which have a larger space therebetween. A contact arm CA is arranged to rotate at a uniform rate about the center of the circle in which the contact segments are located for the purpose of successively connecting the transmission channel to the contact segments.

The remote stations A1 to A9 represent similar consumers of electric energy. For this reason a detailed description of the equipment located at the remote station A1 suffices.

In order to simplify the presentation the remote station A1 employs equipment which is essentially similar to equipment shown in Gambale et al. U.S. Pat. No. 3,343,084 which was issued Sept. 19, 1967. The following reference characters represent components which are similar to components bearing the same reference characters in the aforesaid Gambale et al. patent:

LIST OF COMPONENTS

| | |
|---|---|
| V | Line Voltage |
| I | Load Current |
| $E_{rf}$ | Potential |
| 10, 12 | Leads or conductors of alternating current circuit |
| 14 | Winding |
| 16 | Core |
| 18, 20, 22, 24 | Contact jaws for reception of detachable meter |
| 26 | Hall plate |
| 28, 30 | Leads |
| 32, 60 | Resistors |
| 34 | Hall generator |
| 36, 38 | Leads or output terminals |
| 42 | Core |
| 44, 46, 48 | Input windings |
| 50 | Output windings |
| 52 | Resistor |
| 54 | Transistor |

| 56, 58 | Batteries |
| 62 | Diode |

The reference character 40' indicates a saturable core transformer circuit which is similar to the circuit 40 of the aforesaid Gambale et al. patent except that the auxiliary reset winding 49 of Gambale et al. is not employed and except further that a switch SW1 is added for the purpose of shunting the rectifier or diode 62.

With the switch SW1 open pulses are supplied to the rectifier 62 in the manner discussed in the Gambale et al. patent and such pulses may be employed here for application to the transmission channel TC. When the switch SW1 is closed alternating current is supplied to the transmission channel TC and it will be assumed that the switch SW1 is maintained in its closed condition.

In FIG. 1 the power required by each consumer is sampled at small intervals of the order of every 5 to 15 minutes throughout a billing period such as 1 month. From this statistical sampling an accurate estimate of the total energy required by each of the consumers can be made. The accuracy of this estimate would be of the order of 0.5 percent.

Information concerning the sampling is transmitted over the transmission channel TC to the central station CS. The magnitudes of the samples may be noted or recorded in any suitable manner and from such magnitudes the total energy consumption of a consumer over a billing period may be determined by personal computation or by operation of a conventional computer.

In FIG. 2 power in watts is plotted as ordinates against time as abscissas. The small circles represent the sampling of the power required by the consumer A1 at 10-minute intervals. The area below a line connecting these points represents closely the energy consumption by the consumer and it may be measured in watt-hours. Thus the shaded area in FIG. 2 represents closely the energy consumption of the consumer A1 for a period of 1 hour.

In the specific embodiment of FIG. 1 an alternating current is transmitted over the transmitting channel TC which has a frequency dependent on the magnitude of the power being supplied at the remote station which is connected to the transmitting channel. For present purposes it will be assumed that 1,000 hertz represents no load and 2,000 hertz represents full overload.

The alternating current transmitted over the channel TC may be directed through a switch SW2 to a recorder 74 where it may be recorded for later processing. Preferably an oscillator 70 provides an alternating current having a base or standard frequency which is substantially higher than the highest frequency transmitted over the transmission channel TC.

The output of the oscillator 70 is supplied to a countdown counter 72 which is arranged to count down from a reset count of 2,000. The difference between the reset count of 2,000 and the number of cycles received from the oscillator 70 during a counting operation is recorded by a recorder 74. The counting operation of the countdown counter 72 is controlled by a count-of-10 counter 76.

Assuming that a frequency of 1,000 hertz transmitted by the transmission channel TC represents no load of the associated consumer and that a frequency of 2,000 hertz represents full overload for the associated consumer the oscillator 70 may have a frequency of 200,000 hertz. The counter 72 is of the countdown type and has a reset reading of 2,000. Each cycle effectively applied by the oscillator to the counter 72 lowers the count on the counter by 1.

When the transmission channel TC is connected to a consumer an input is supplied to the counter 76 within the range of 1,000 hertz to 2,000 hertz and the counter 76 starts to count up to 10. The counter 76 places the counter 72 in condition to count down. When the counter 76 reaches a count of 10 it cuts off the signal to the counter 72 and the counter 72 thereupon records its count in the recorder 74 and resets to a count of 2,000. The counter 72 remains in the reset condition until another signal is received from the counter 76.

As the arm CA moves to the next contact segment a signal may be transmitted over the transmission channel TC for the purpose of resetting the counter 76. Thus a reset segment may be located between each pair of contact segments for the purpose of transmitting a distinctive signal for resetting purposes. For present purposes it will be assumed that the temporary loss of signal as the arm CA proceeds to the next contact segment results in reset of the computer 76.

When the arm CA reaches the next contact segment a frequency again is transmitted over the transmission channel TC having a value dependent on the load at the associated consumer. This frequency again starts a counting operation of the counter 76 and a countdown operation of the counter 72. When the counter 76 again reaches a count of 10 its output is terminated and the counter 72 operates to record the count which it has reached and then it is reset. In this way the system of FIG. 1 operates through repetitive cycles during each of which the counter 72 records in the recorder 74 a value representing the power then required for each of the consumers.

Thus if a signal having a frequency of 1,000 hertz (no load) is transmitted over the channel the countdown counter is driven to a count of 0 indicating no load. If the signal frequency is 2,000 hertz (full overload) the countdown counter is driven to a count of 1,000 (full overload) during 10 cycles of the signal.

The recorder 74 may be of any conventional type such as a magnetic recorder, a punchcard recorder or a printing recorder. If desired an output from the counter 72 may be supplied directly to the computer 78 for the purpose of initiating the computations required for billing purposes.

If desired the records provided by the recorder 74 may be turned over to a clerk for the purpose of preparing bills by the procedure indicated in FIG. 2.

The records may be in any form suitable for the computer 78 which can be arranged in accordance with standard techniques to make the required computations and to supply the necessary information to a printout device 80 which can print out the bills.

The frequency transmitted by the transmission channel TC need not be a linear function of the loads being measured. Nonlinear functions can be readily handled by conventional computer techniques.

If billing based on ampere-hours is desired the Hall generator 34 of FIG. 1 may be replaced by a current-responsive device 34' shown in FIG. 3. The device 34' includes a transformer 82 having a magnetic core in the form of a loop through which the conductor 12 passes to serve as a primary winding. The current transformer has a secondary winding 84 connected to the input terminals of a full-wave rectifier 86. The output terminals of the rectifier 86 are connected across a resistor 88 and a filter capacitor 90. Thus a voltage is developed across the resistor 88 which is dependent on current flowing in the conductor 12. The resistor 88 is connected across the input terminals of the saturable core transformer circuit 40' through leads 36a and 38a which replace the leads 36 and 38 of FIG. 1. The winding 84, the rectifier 86, the capacitor 90, the resistor 88 and a portion of the core of the transformer 82 may be cast or potted in insulating material as represented by the broken line rectangle 92.

At the central station CS it is advisable that the records provided by the recorder 74 be associated with the proper consumers. Such association may be effected by transmitting identifying information over the channel TC in a conventional manner. In the specific embodiment of FIG. 1 a large spacing is provided between the contact segments CS1 and CS9. When this large spacing is detected at the recorder the record next prepared is definitely associated with the consumer or remote station A1.

If 30 milliseconds is allowed for scanning each remote station a total of 10,000 remote stations or meters can be scanned in 5 minutes.

One of the major deterrents to the adoption of proposals on remote reading of watt-hour meters has been the integration or storage of accumulated watt-hour (energy) information until such time as a system could read out this information. This invention proposes a method such that a register or counter is not needed since a sampling is done and the integration is done by a central computer. The cost of a register for a solid-state watt-hour meter is generally prohibitive. Essentially, then, this invention proposes a wattmeter or ammeter which puts out a frequency proportional to watts and the integration into watt-hours is done by a single central computer.

We claim:

1. An arrangement for determining the usage by consumers of the product of a distribution system, comprising: a central station, a plurality of remote stations each associated with a separate user of the product being determined, a common transmission channel extending substantially from the central station towards the remote station for successively coupling each of the remote stations to said central station in repetitive cycles, signal means effective at each of said remote stations at the time of coupling to the central station for transmitting to the central station a sample signal representing the rate of usage of said product, means at the central station for recording rates of usage dependent on said signals, and means responsive to the recorded rates for estimating the total usage of said product at each remote station.

2. An arrangement as claimed in claim 1 wherein said distribution system comprises an electrical distribution system and said sample signals represent electric current.

3. An arrangement as claimed in claim 1 wherein said distribution system comprises an electrical distribution system and said sample signals represent electric power.

4. An arrangement as claimed in claim 1 wherein signal means includes means for producing a quantity having a signal magnitude dependent on the magnitude of the product to be determined, and means for producing an alternating current sample signal having a frequency dependent on said signal magnitude for transmission to the central station.

5. An arrangement as claimed in claim 4 wherein said central station comprises means responsive to said sample signal for producing pulses dependent in number to the frequency of the sample signal, and means for counting said pulses to indicate the instantaneous magnitude of the product to be determined.

6. An arrangement as claimed in claim 5 wherein said distribution system is an electrical distribution system and said sample signals represent electric power, and means responsive to the instantaneous magnitudes occurring over a period of time for determining the energy consumption during such period.

7. An arrangement as claimed in claim 5 wherein said distribution system is an electrical distribution system and said sample signals represent electric current, and means responsive to the instantaneous magnitudes occurring over a period of time for determining the ampere-hour consumption during such period.

8. An arrangement as claimed in claim 1 wherein said signal means at each of the remote stations comprises means for transmitting to the central station when each of the remote stations is coupled to the central station a sample signal in the form of signal units having a number dependent on the rate of usage of said product during a period which is a fraction of the cycle time required for the successive coupling of all of said remote stations to the central station, whereby time-spaced sample signals are sequentially transmitted from the remote stations to the central station, said central station comprising translating means responsive to said signal units for producing a record representative of the number of said signal units.

9. The method of determining at a central station the usage of an electric quantity over a period of time at a plurality of remote stations which comprises during each of a plurality of cycles successively transmitting from each of the remote stations a sample signal representing the magnitude of the electric quantity at the time of transmission, associating the sample signals for each of the remote stations occurring over a period of time, and computing the area of the curve of the magnitudes represented by said sample signals plotted against time over said period of time for each of the remote stations.

10. A method as claimed in claim 9 wherein each of said cycles comprises the step of transmitting successively from each of said remote stations a sample signal in the form of a number of signal units representative of the magnitude of the electric quantity at the time of transmission, and determining from each of said sample signals the magnitude represented by such sample signal.

* * * * *